(12) United States Patent
Kitamura

(10) Patent No.: US 7,496,766 B2
(45) Date of Patent: Feb. 24, 2009

(54) APPARATUS, METHOD, AND PROGRAM PRODUCT FOR SECURE DATA FORMATTING AND RETRIVING, AND COMPUTER READABLE TRANSPORTABLE DATA RECORDING MEDIUM STORING THE PROGRAM PRODUCT

(75) Inventor: Yuuji Kitamura, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 860 days.

(21) Appl. No.: 10/874,175

(22) Filed: Jun. 24, 2004

(65) Prior Publication Data

US 2005/0021988 A1 Jan. 27, 2005

(30) Foreign Application Priority Data

Jun. 26, 2003 (JP) .............................. 2003-182892

(51) Int. Cl.
- G06F 12/14 (2006.01)
- G06F 9/06 (2006.01)
- H04L 9/32 (2006.01)

(52) U.S. Cl. ...................... 713/191; 713/184; 380/201; 705/57; 386/94

(58) Field of Classification Search ................. 713/191, 713/184; 380/201; 705/57; 386/94
See application file for complete search history.

(56) References Cited

U.S. PATENT DOCUMENTS

| 7,209,562 B2 * | 4/2007 | Bernsen ...................... 380/277 |
| 2005/0018848 A1 * | 1/2005 | Aoyama et al. ............. 380/255 |

FOREIGN PATENT DOCUMENTS

| JP | 6-274880 | * | 9/1994 |
| JP | 9-306097 | * | 11/1997 |
| JP | 9-319573 | * | 12/1997 |
| JP | 10-21144 | * | 1/1998 |
| JP | 10-83297 | * | 3/1998 |
| JP | 2888958 | | 2/1999 |
| JP | 2000-148504 | * | 5/2000 |
| JP | 2000-148689 | * | 5/2000 |
| JP | 2002-251746 | * | 9/2002 |

* cited by examiner

*Primary Examiner*—Nasser G Moazzami
*Assistant Examiner*—Eleni A Shiferaw
(74) *Attorney, Agent, or Firm*—Dickstein Shapiro LLP

(57) ABSTRACT

A computer readable transportable information recording medium includes a recordable area and a read only area. The recordable area allows recording of data thereinto and reading of the data therefrom. The read only area stores a copy judging program, an encrypting program, a recording program, a decoding program, a first password control program, and a second password control program. The copy judging program judges whether a transportable information recording medium has been undergone a copy operation. The encrypting program encrypts data designated and stored in a computer. The recording program records the data encrypted by the encrypting program into the recordable area. The decoding program decodes the data encrypted and stored in the recordable area. The first password control program sets or judges a password when the encrypting program is activated. The second password control program judges a password when the decoding program is activated.

5 Claims, 15 Drawing Sheets

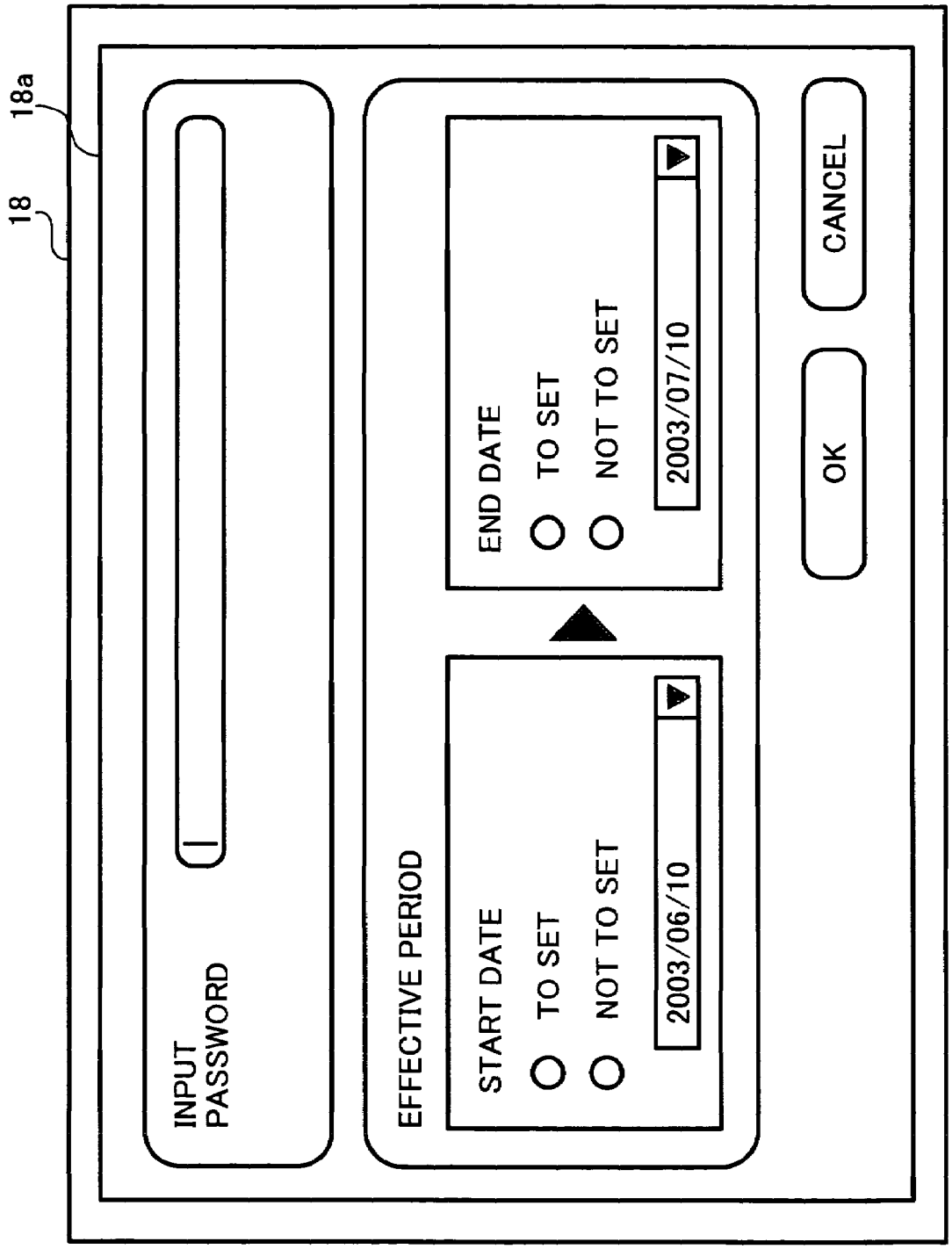

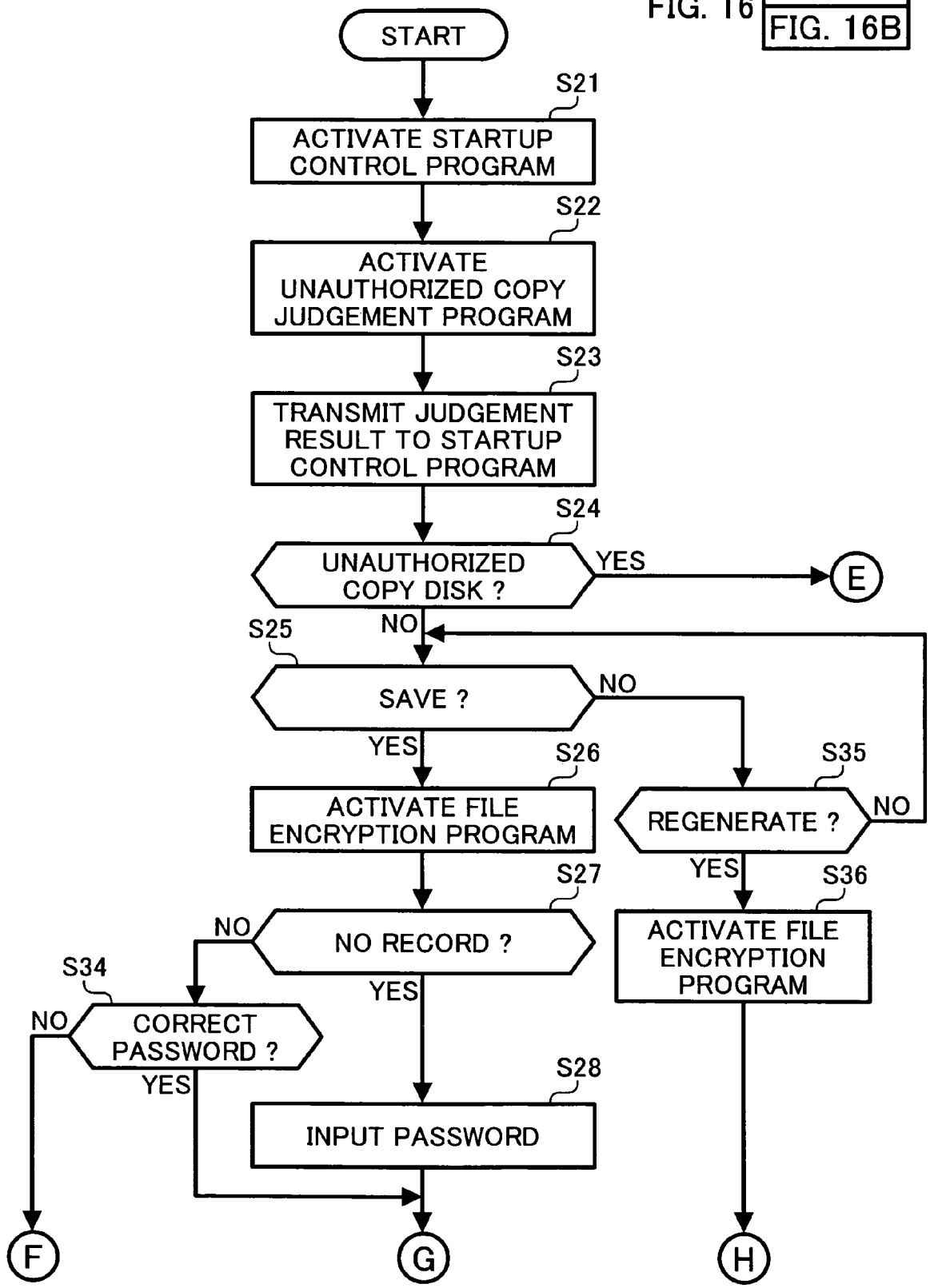

APPARATUS, METHOD, AND PROGRAM PRODUCT FOR SECURE DATA FORMATTING AND RETRIVING, AND COMPUTER READABLE TRANSPORTABLE DATA RECORDING MEDIUM STORING THE PROGRAM PRODUCT

BACKGROUND OF THE INVENTION

1. Field of the Invention

The present invention relates to an apparatus, a method, and a program product for secure data formatting and retrieving and a transportable data recording medium storing the program product, and more particularly to an apparatus, a method, and a program product for secure data formatting and retrieving and a transportable data recording medium storing the program product by arranging a read only area and a recordable area.

2. Discussion of the Background

As both an infrastructure and techniques for networking have rapidly developed in recent years, usage of networks to carry out transmission of digital data has become common. Typical examples are sending e-mail, downloading of digital data from a web site, and sharing of digital data in a local area network, for example.

On the other hand, however, security issues with respect to the digital data has not solved yet, such as information leakage via networks, invasion by virus, and so on. Accordingly, a data transportable medium effective in an offline mode still has an important role. In particular, CD-ROMs including a CD-R and a CD-RW are useful since nearly every personal computer is equipped with an optical disc drive apparatus.

As one variation of the CD-ROM, a hybrid CD-RW has recently been developed, in which a read only area coexists with a recordable area.

It should be aware that even the above-mentioned offline transportable data medium is not perfect from a security view point. For example, the offline medium always has a risk of loss, an illegal usage when it is rent, etc. That is, since the transportability is a nature of the offline medium, it has a risk of information leakage and invasion by virus, just as is facing on the networks, when being away from the user.

Accordingly, protection of digital data recorded on the CD-ROM becomes important, and conventional techniques of an anti-copy and a data encryption are adopted for such purposes. However, these conventional techniques are already-produced tools and users need to develop own techniques to fit them into user's application, which is not an easy task for the users.

SUMMARY OF THE INVENTION

This patent specification describes a novel computer readable transportable information recording medium which includes a recordable area and a read only area. The recordable area allows recording of data thereinto and reading of the data therefrom. The read only area stores a plurality of programs including a copy judging program, an encrypting program, a recording program, a decoding program, a first password control program, and a second password control program. The copy judging program judges whether a transportable information recording medium has been undergone a copy operation. The encrypting program encrypts data designated and stored in a computer. The recording program records the data encrypted by the encrypting program into the recordable area. The decoding program decodes the data encrypted and stored in the recordable area. The first password control program sets or judges a password when the encrypting program is activated. The second password control program judges a password when the decoding program is activated.

The plurality of programs may further include a storing program storing the data decoded by the decoding program in a different information recording medium connected to the computer.

The plurality of programs may further include an extending program extending the data decoded by the decoding program into a memory of the computer and a displaying program displaying the data extended in the memory of the computer by the extending program on a display apparatus connected to the computer.

The first password control program may allow a user to set a password when the recordable area has not been undergone a data recording and judges a password when the recordable area has been undergone a data recording.

The first password control program may set or judge a password and a password effective period.

In the above-mentioned transportable information recording medium, an upgrading program version corresponding to one of the plurality of programs stored in the read only area may be recorded in the recordable area.

The copy judging program may obtain unique data recorded in an information track of the transportable information recording medium according to predefined rules and judges whether the transportable information recording medium has been undergone a copy operation based on the unique data obtained.

The predefined rules may be made based on a plurality of recording methods.

The plurality of recording methods may include an uninterrupted method and an incremental method.

Further, in one example, a novel method of data recording to a transportable information recording medium includes the steps of providing, activating, judging, initiating, setting, opening, encrypting, starting, and recording. The providing step provides a recordable area which allows recording of data thereinto and reading of the data therefrom and a read only area which stores a plurality of programs. The plurality of programs include a copy judging program, an encrypting program, a recording program, and a first password control program. The copy judging program judges whether a transportable information recording medium has been undergone a copy operation. The encrypting program encrypts data designated and stored in a computer. The first password control program sets or judges a password when the encrypting program is activated.

The activating step activates the copy judging program when the transportable information recording medium is placed in a computer. The judging step judges with the copy judging program whether the transportable information recording medium has been undergone a copy operation. The initiating step initiates the first password control program when the copy judging program judges that the transportable information recording medium has not been undergone a copy operation and when a way of data storing is set. The setting step sets a password or checking if a password is correct with the first password control program. The opening step opens the encrypting program upon a time the password is set or a password is checked as correct with the first password control program. The encrypting step encrypts data designated and stored in the transportable information recording medium, using the encrypting program. The starting step starts the recording program. The recording step records the data encrypted in the encrypting step in the recordable area.

The first password control program may set or judge a password and a password effective period.

In the above-mentioned method, an upgrading program version corresponding to one of the plurality of programs stored in the read only area may be recorded in the recordable area.

Further, in one example, a novel method of data recording to a transportable information recording medium includes the steps of providing, activating, judging, initiating, checking, opening, decoding, starting, and recording. The providing step provides a recordable area which allows recording of data thereinto and reading of the data therefrom and a read only area which stores a plurality of programs. The plurality of programs includes a copy judging program judging whether a transportable information recording medium has been undergone a copy operation. The recording program records data. The decoding program decodes the data encrypted and stored in the recordable area. The second password control program judges a password when the decoding program is activated. The activating step activates the copy judging program when the transportable information recording medium is placed in a computer. The judging step judges with the copy judging program whether the transportable information recording medium has been undergone a copy operation. The initiating step initiates the second password control program when the copy judging program judges that the transportable information recording medium has not been undergone a copy operation and when a way of data storing is set. The checking step checks if a password is correct with the second password control program. The opening step opens the decoding program upon a time the password is checked as correct with the second password control program. The decoding step decodes data encrypted and stored in the recordable area of the transportable information recording medium, using the decoding program. The starting step starts the recording program. The recording step records the data decoded in the decoding step into a different information recording medium connected to a computer.

Further, in one example, a novel method of data recording to a transportable information recording medium includes the steps of providing, activating, judging, initiating, checking, opening, decoding, starting, executing, running, and displaying. The providing step provides a recordable area which allows recording of data thereinto and reading of the data therefrom and a read only area which stores a plurality of programs. The plurality of programs include a copy judging program, a recording program, a decoding program, an executing program, a displaying program, and a second password control program. The copy judging program judges whether a transportable information recording medium has been undergone a copy operation. The recording program records data. The decoding program decodes the data encrypted and stored in the recordable area. The extending program extends decoded data in a memory of a computer. The displaying program displays data extended in the memory of the computer on a display connected to the computer. The second password control program judges a password when the decoding program is activated. The activating step activates the copy judging program when the transportable information recording medium is placed in a computer. The judging step judges with the copy judging program whether the transportable information recording medium has been undergone a copy operation. The initiating step initiates the second password control program when the copy judging program judges that the transportable information recording medium has not been undergone a copy operation and when a way of data storing is set. The checking step checks if a password is correct with the second password control program. The opening step opens the decoding program upon a time the password is checked as correct with the second password control program. The decoding step decodes data encrypted and stored in the recordable area of the transportable information recording medium, using the decoding program. The starting step starts the extending program. The extending step extends with the extending program the data decoded in the decoding step in the memory of the computer. The running step runs the displaying program. The displaying step displays the data extended in the extending step on the display connected to the computer.

The second password control program may judge a password and a password effective period.

In the above-mentioned method, an upgrading program version corresponding to one of the plurality of programs stored in the read only area may be recorded in the recordable area.

Further, in one example, a computer program product stored on a computer readable transportable storage medium for, when run on a data processing apparatus, carrying out a data recording operation to the computer readable transportable storage medium. The computer program includes steps of providing, activating, judging, initiating, setting, opening, encrypting, starting, and recording. The providing step provides a recordable area which allows recording of data thereinto and reading of the data therefrom and a read only area which stores a plurality of programs comprising. The copy judging program judges whether a transportable information recording medium has been undergone a copy operation. The encrypting program encrypts data designated and stored in a computer. The first password control program sets or judges a password when the encrypting program is activated. The activating step activates the copy judging program when the transportable information recording medium is placed in a computer. The judging step judges with the copy judging program whether the transportable information recording medium has been undergone a copy operation. The initiating step initiates the first password control program when the copy judging program judges that the transportable information recording medium has not been undergone a copy operation and when a way of data storing is set. The setting step sets a password or checking if a password is correct with the first password control program. The opening step opens the encrypting program upon a time the password is set or a password is checked as correct with the first password control program. The encrypting step encrypts data designated and stored in the transportable information recording medium, using the encrypting program. The starting step starts the recording program. The recording step records the data encrypted in the encrypting step in the recordable area.

The first password control program may set or judge a password and a password effective period. Further, in one example, a novel method of data recording to a transportable information recording medium includes the steps of providing, activating, judging, initiating, checking, opening, decoding, starting, and recording.

Further, in one example, a computer program product stored on a computer readable transportable storage medium for, when run on a data processing apparatus, carrying out a data recording operation to the computer readable transportable storage medium. The computer program includes steps of providing, activating, judging, initiating, setting, opening, decoding, starting, and recording. The providing step provides a recordable area which allows recording of data thereinto and reading of the data therefrom and a read only area which stores a plurality of programs comprising. The copy judging program judges whether a transportable information recording medium has been undergone a copy operation. The recording program records data. The decoding program decodes the data encrypted and stored in the recordable area. The second password control program judges a password when the decoding program is activated. The activating step activates the copy judging program when the transportable information recording medium is placed in a computer. The judging step judges with the copy judging program whether the transportable information recording medium has been undergone a copy operation. The initiating step initiates the second password control program when the copy judging program judges that the transportable information recording medium has not been undergone a copy operation and when a way of data storing is set. The checking step checks if a password is correct with the second password control program. The opening step opens the decoding program upon a time the password is checked as correct with the second password control program. The decoding step decodes data encrypted and stored in the recordable area of the transportable information recording medium, using the decoding program. The starting step starts the recording program. The recording step records the data decoded in the decoding step into a different information recording medium connected to a computer.

Further, in one example, a computer program product stored on a computer readable transportable storage medium for, when run on a data processing apparatus, carrying out a data recording operation to the computer readable transportable storage medium. The computer program includes steps of providing, activating, judging, initiating, checking, opening, decoding, starting, executing, running, and displaying. The providing step provides a recordable area which allows recording of data thereinto and reading of the data therefrom and a read only area which stores a plurality of programs. The plurality of programs include a copy judging program, a recoding program, an extending program, displaying, and a second password control program. The copy judging program judges whether a transportable information recording medium has been undergone a copy operation. The recording program records data. The decoding program decodes the data encrypted and stored in the recordable area. The extending program extends decoded data in a memory of a computer. The displaying program displays data extended in the memory of the computer on a display connected to the computer. The second password control program judges a password when the decoding program is activated. The activating step activates the copy judging program when the transportable information recording medium is placed in a computer. The judging step judges with the copy judging program whether the transportable information recording medium has been undergone a copy operation. The initiating step initiates the second password control program when the copy judging program judges that the transportable information recording medium has not been undergone a copy operation and when a way of data storing is set. The checking step checks if a password is correct with the second password control program. The opening step opens the decoding program upon a time the password is checked as correct with the second password control program. The decoding step decodes data encrypted and stored in the recordable area of the transportable information recording medium, using the decoding program. The starting step starts the extending program. The extending step extends with the extending program the data decoded in the decoding step in the memory of the computer. The running step runs the displaying program. The displaying step displays the data extended in the extending step on the display connected to the computer.

The second password control program may judge a password and a password effective period.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9-11 are illustrations of exemplary screens displayed on a display apparatus of the system shown in FIG. 7;

DETAILED DESCRIPTION OF PREFERRED EMBODIMENTS

Figure 1:
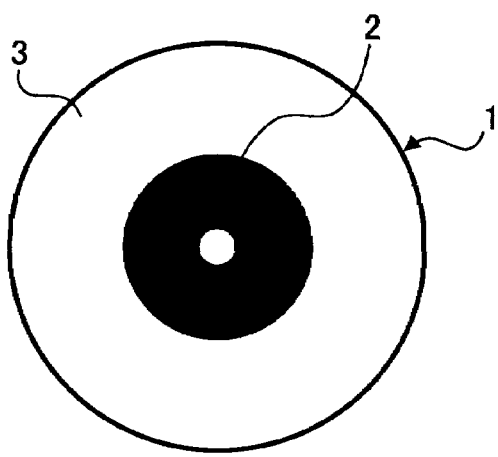
FIG. 1 is an illustration of a hybrid CD-R according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a hybrid CD-R 1 is explained as one example of a portable information recording media according to an exemplary embodiment of the present invention.

As CD-R/RW standards (i.e., the Philips and Sony's Recordable CD Standard, the so-called orange book published in 1990) define such that "A hybrid disc is a multi-session disc of which the first session is a mastered session," the hybrid CD-R 1 includes a read-only area 2 and a recordable area 3, as illustrated in FIG. 1. The read-only area 2 allows only reading like a read only memory and is therefore referred to as a ROM (read only memory) area, and the recordable area 3 allows writing in and reading out like a random access memory and is therefore referred to as a RAM (random access memory). A recording method of multi-session may be referred to as a track-at-once recording method which is also referred to as an uninterrupted recording method.

Figure 2:
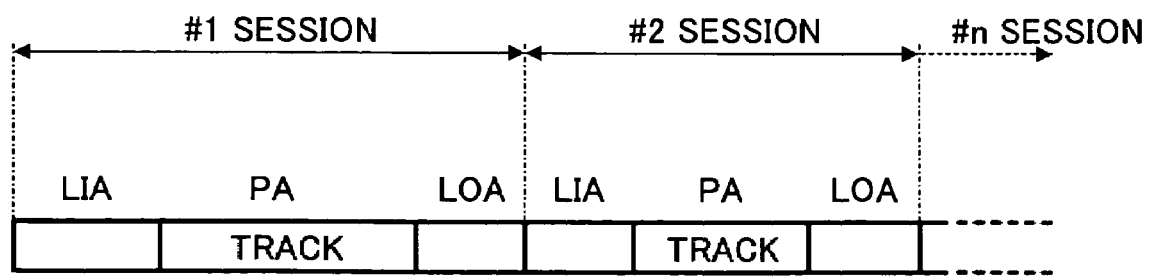
FIG. 2 is an illustration of an exemplary CD format of the hybrid CD-R of FIG. 1.
Figure 3:
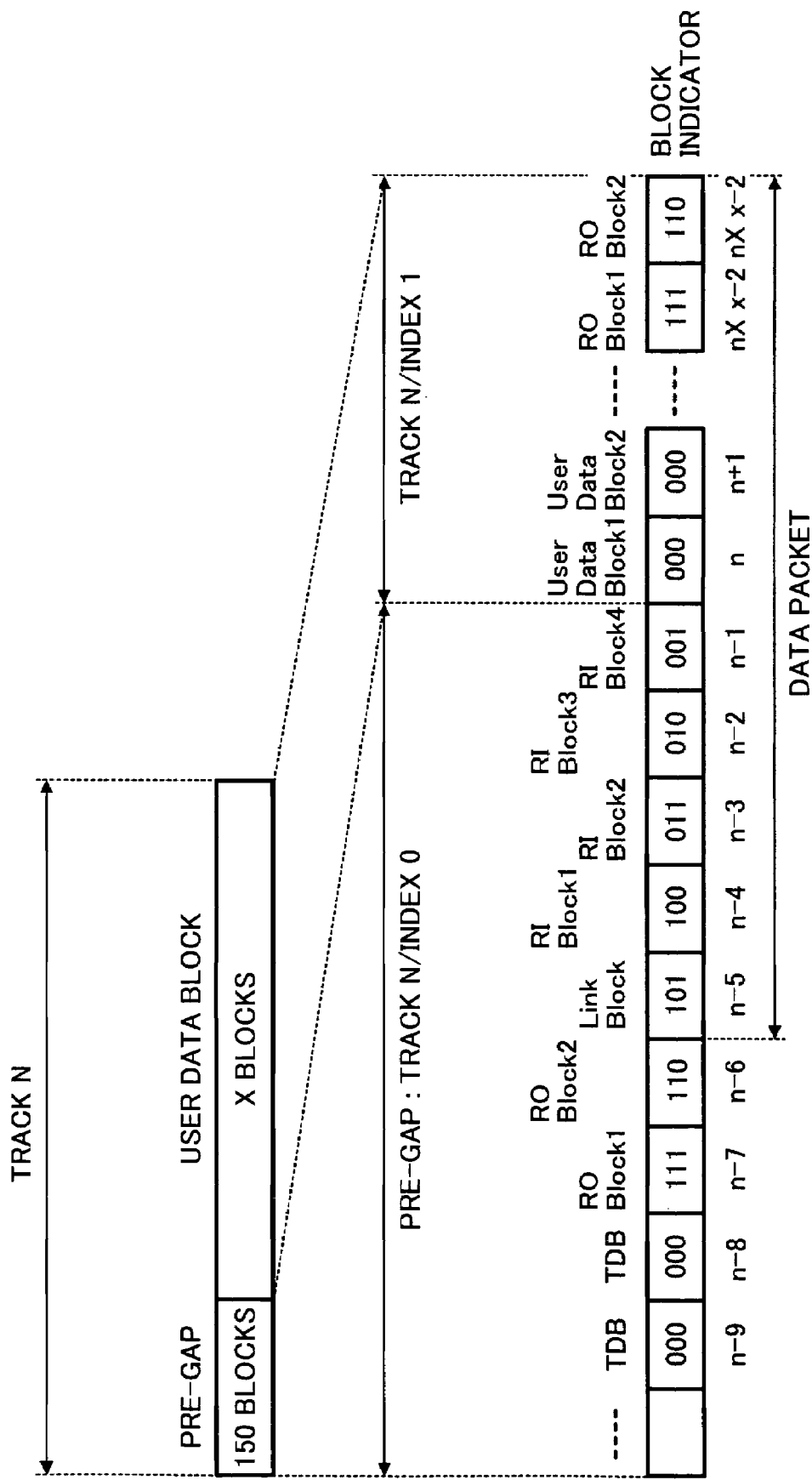
FIG. 3 is an illustration of an exemplary track format of the CD format of FIG. 2.
Figure 4:
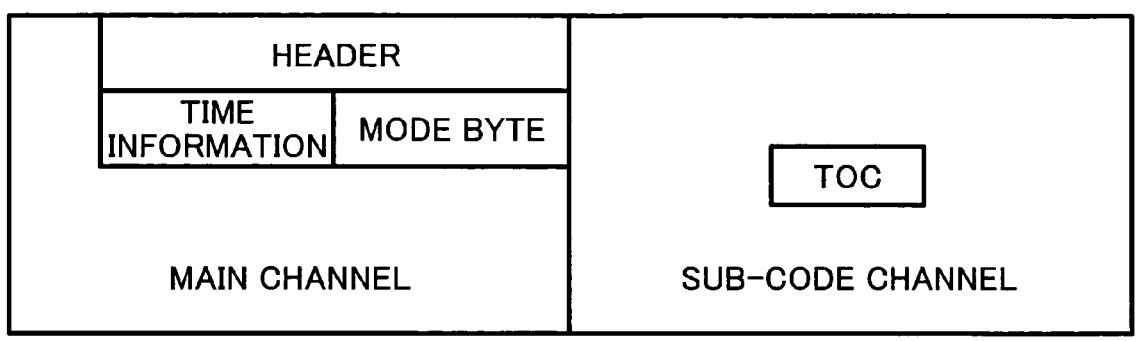
FIG. 4 is an illustration of exemplary internal formats of run-out blocks, link blocks, and run-in blocks shown in FIG. 3.
Figure 5:
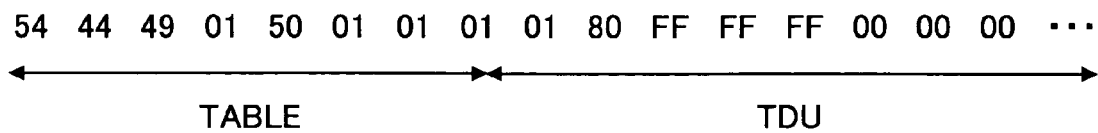
FIG. 5 is an illustration of an exemplary internal format of a track descriptor block of FIG. 3.

FIG. 2 shows an exemplary CD format of the hybrid CD-R 1. FIG. 3 shows an exemplary data format of a track of the CD format shown in FIG. 2. FIG. 4 shows an exemplary internal format of blocks of the hybrid CD-R 1, including a run-out (RO) block, a link block, and a run-in (RI) block which are shown in FIG. 3. FIG. 5 shows an exemplary internal format of data in a track descriptor block (TDB) shown in FIG. 3.

As illustrated in FIG. 2, the hybrid CD-R 1 includes a plurality of sessions from a first session to an n-th session. Among the sessions, the first session is the read-only area 2, and a second session and subsequent sessions are the recordable area 3. In the discussion below, a program is recorded in the first session.

Each session includes a lead-in area (LIA), a program area (PA), and a lead-out area (LOA), and a data recording is carried out by the packet. The program area (PA) includes one or more tracks. The packet write recording method may be referred to as an incremental recording method.

There are two packet information recording methods; a fixed packet (FP) system and a variable packet (VP) system. In the fixed packet system, data is recorded in units of packet having a predetermined packet size. On the other hand, in the variable packet system, data is recorded in units of packet having a variable packet size according to a data size.

The program area includes one or more tracks, and each track is provided with a pre-gap at a leading portion thereof including a track descriptor block (TDB), a run-out (RO) block, a link block, and a run-in (RI) block. For example, such a pre-gap contains 150 blocks. The pre-gap is followed by a user data block.

As illustrated in FIG. 4, the format of the run-out block, the link block, and the run-in block includes a main channel and a sub-code channel. The main channel includes a header (i.e., a block header) in which time information and a mode byte are recorded. The mode byte is provided with a block indicator (not shown) for distinguishing the run-out block, the link block, and the run-in block the from the user data block.

As shown in FIG. 5, attributes of a track are recorded in a track descriptor unit (TDU) of the data field of TDB.

In a sub-code channel of PA shown in FIG. 4, time information indicating a relative address in a track and an absolute address in a disc are recorded, as well as a control and an address (ADR) indicating information of a track. The control and the address (ADR) are also recorded in TOC (track of contents) of LIA.

For a data track consecutively recorded in a copy protection mode, a TDU's write mode (hereinafter referred to simply as TDU) is represented by "80" (i.e., "10000000" in a binary expression) and a control is represented by "4" (i.e., "0100").

For a data track recorded in a variable packet (VP) mode, TDU is "90" (i.e., "10010000") and the control is "5" (i.e., "0101").

Figure 6:
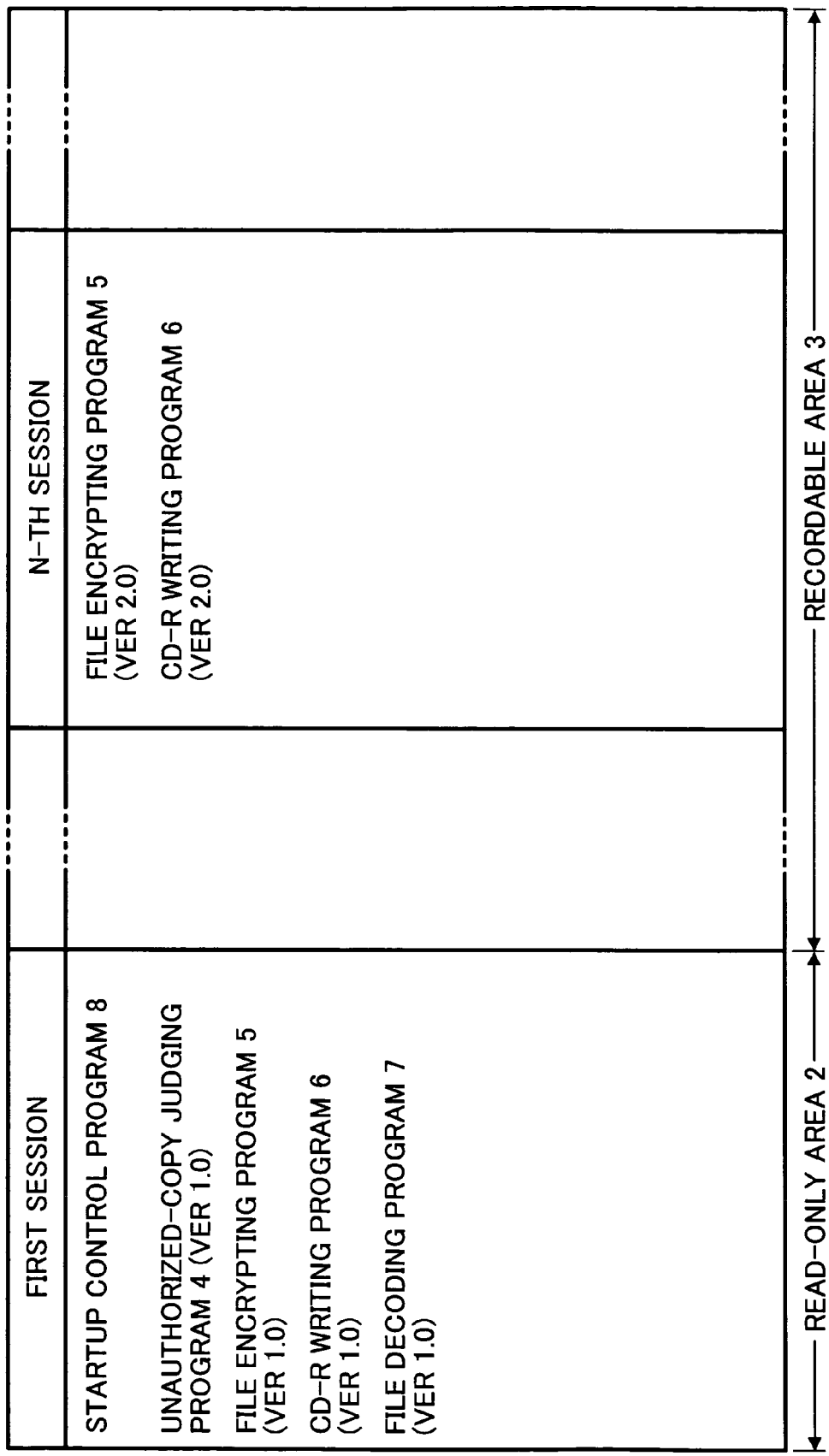
FIG. 6 is a diagram for explaining programs recorded in a read only area of the hybrid CD-R of FIG. 1.

The hybrid CD-R 1 has previously been recorded in its ROM area 2 with programs including an unauthorized-copy judging program 4, a file encrypting program 5, a CD-R writing program 6, a file decoding program 7, and a startup control program 8, as shown in FIG. 6.

In the present embodiment, the unauthorized-copy judging program 4 includes an exemplary judgment method explained below and the file encrypting program 5 includes an encryption according to a data encryption standard (DES) developed by IBM (International Business Machines Corp.) and which is known per se.

Also, the CD-R writing program 6 includes a CD-R writing technique of a standard CD-R writing software. The file decoding program 7 includes a decoding according to the data encryption standard (DES) developed by IBM (International Business Machines Corp.) and which is known per se.

Figure 7:
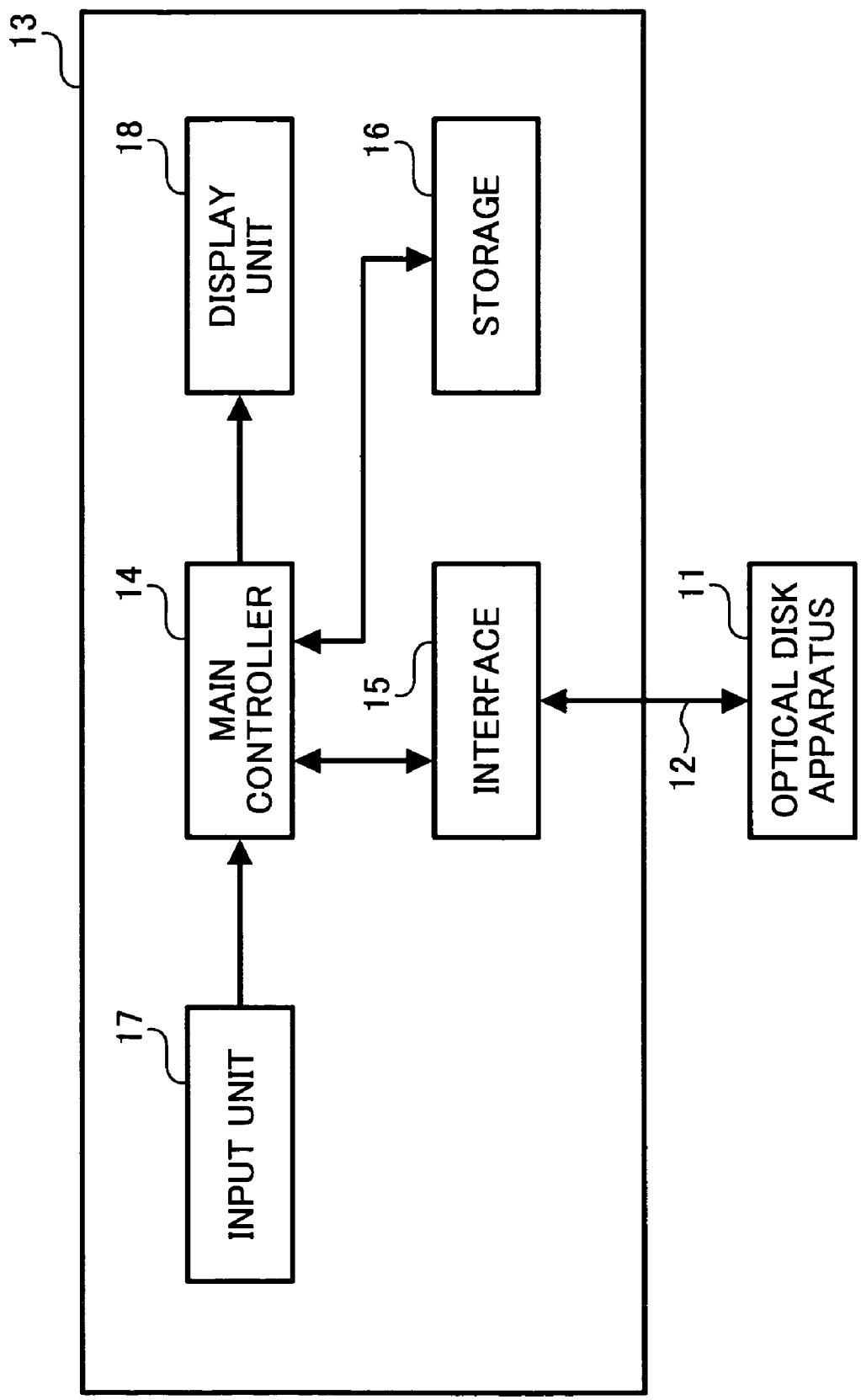
FIG. 7 is a block diagram for explaining a system including a host computer and an optical disc drive apparatus.

In FIG. 7, an exemplary structure of a data processing system according to an exemplary embodiment of the present invention is shown. The data processing system of FIG. 7 includes an optical disc drive apparatus 11, a communication cable 12, a host computer 13, a main controller 14, an interface 15, a data storage 16, an input unit 17, and a display unit 18. The optical disc drive apparatus 11 communicates with the hose computer 13 via the communications cable 12

The main controller 14 includes a microcomputer (not shown), a memory (not shown) serving as an information storing device, and so forth and controls the entire operations of the host computer 13.

The interface 15 interfaces bi-directional communications with the optical disc drive apparatus 11 and conforms to the standard interfaces such as ATAPI (ATA packet interface), CSI (Inter Application Communication Support Interface), and so on so as to be connected to an ATAPI/SCSI interface cable of the optical disc drive apparatus 11. The connection between the interfaces can be a infrared wireless connection instead of a communications cable (e.g., the communications cable 12).

The data storage 16 stores a program written in a code system readable by the microcomputer of the main controller 14. The program stored in the data storage 16 is downloaded to the memory of the main controller 14 upon a time a power source for driving the host computer 13 turns on.

The display unit 18 includes a CRT (cathode ray tube), an LCD (liquid crystal display), or a plasma display, which is not shown, for displaying various kinds of information transmitted from the main controller 14.

The input unit 17 includes at least one of input media including a keyboard, a mouse, and a pointing device, which are not shown, to enter various kinds of information input by the user to the main controller 14. The information from the input media can be entered through a wireless communication, for example. Also, it is possible to use a CRT with a touch-sensing panel which combines the input unit 17 and the display unit 18.

In addition, the host computer 13 stores an operating system (OS) for administrating entire deices included in the host computer 13.

Figure 8A:
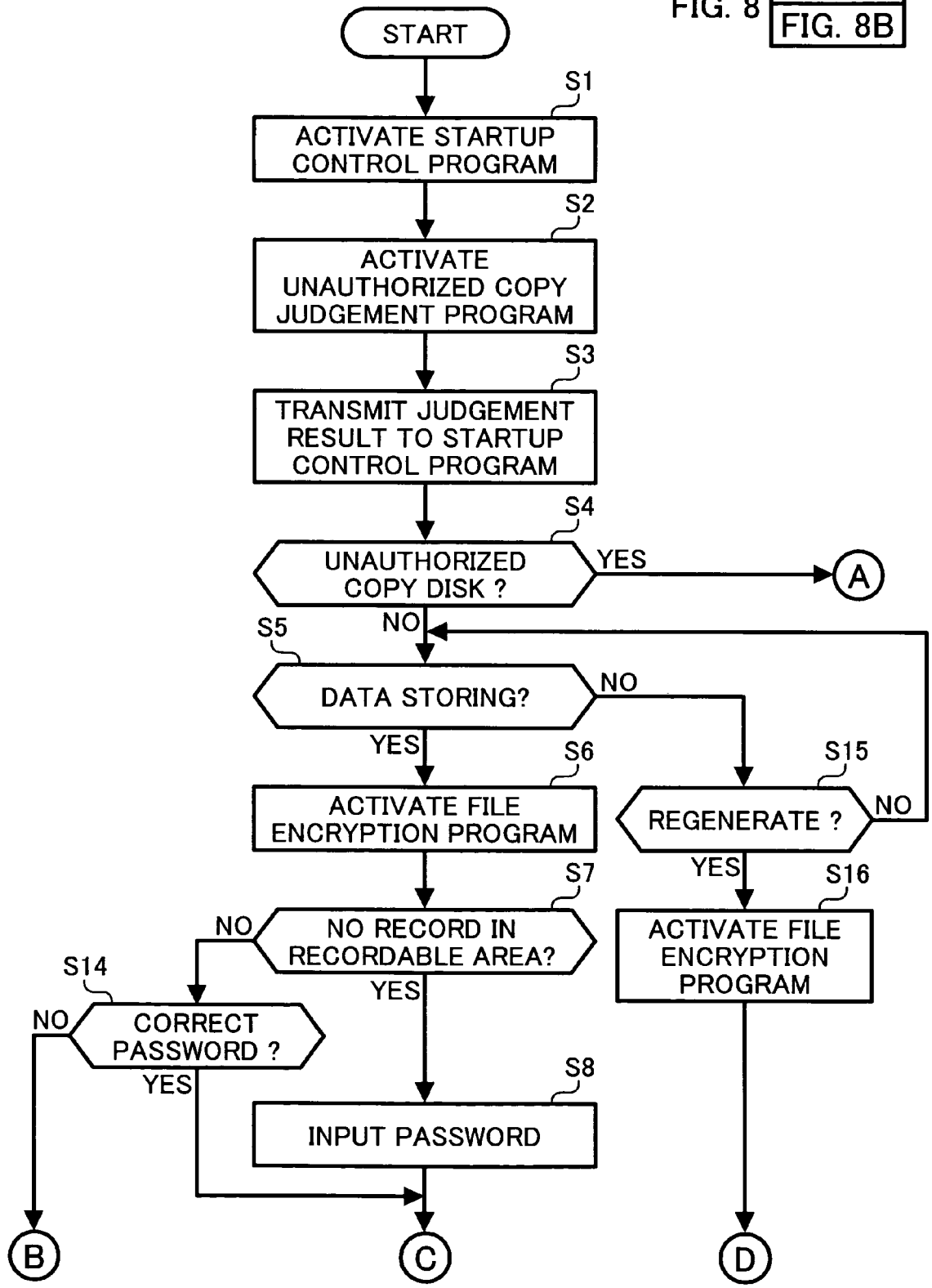
FIG. 8 is a flowchart for explaining an exemplary procedure of an unauthorized-copy judging operation performed by the programs recorded in the hybrid CD-R of FIG. 1.
Figure 8B:
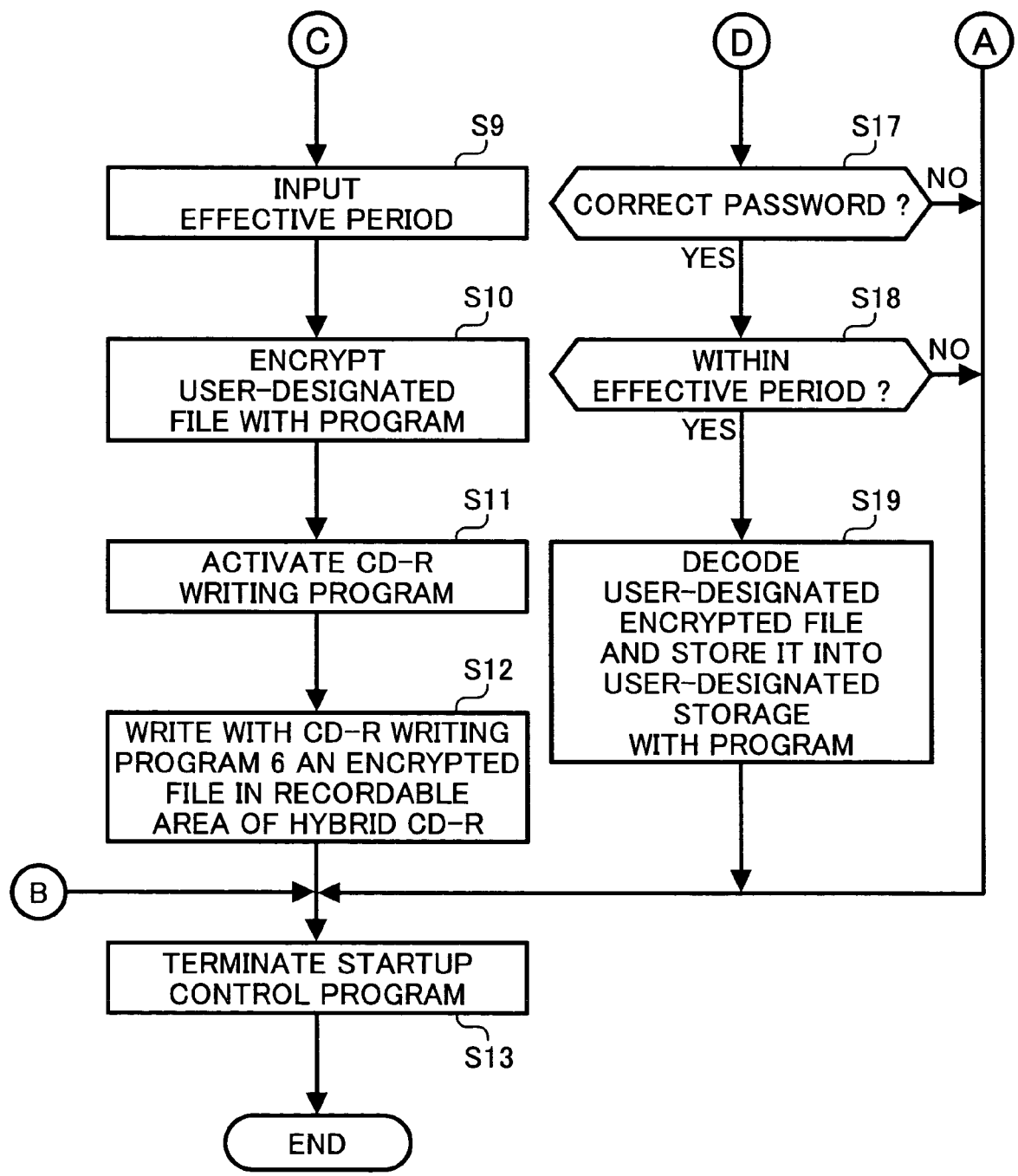

Referring now to FIG. 8, an exemplary operation of the optical disc drive apparatus 11 with the hybrid CD-R 1 inserted is explained. The operating system of the hose computer 13 has a function for activating the programs stored in a CD-R when the CD-R is inserted thereto.

In Step 1 of FIG. 8, the startup control program 8 is activated by the above-mentioned function of the operating system upon an insertion of the hybrid CD-R 1 to the optical disc drive apparatus 11. In Step S2, the startup control program 8 activates the unauthorized-copy judging program 4 which then determines whether the hybrid CD-R 1 is a disc with the unauthorized copy. Subsequently, the unauthorized-copy judging program 4 transmits the determination result to the startup control program 8, in Step S3.

In step S4, by referring to the determination result sent from the unauthorized-copy judging program 4, the startup control program 8 proceeds to Step S13 to terminate the operation when the determination result indicates the hybrid CD-R 1 is determined as a disc with an unauthorized-copy. When the determination result indicates the hybrid CD-R1 is determined as not a disc, the startup control program 8 Step S5. In Step S5, the startup control program 8 determines whether the user requests a data storing operation. The startup control program 8 proceeds to Step S6 when the user request is determined as the data storing operation and to Step S15 when the user request is determined as not the data storing operation.

In Step S6, the startup control program 8 activates the file encrypting program 5. Subsequently, in Step S7, the startup control program 8 activates the CD-R writing program 6 and determines whether the recordable area 3 is an area which has not been written yet. Then, the startup control program 8 proceeds its operation to Step S8 when the RAM area 3 is determined as not having been written yet but to Step S14 when the RAM area 3 is determined as having already been written.

In Step S8, the display unit 18 is caused to show a first screen 18a, illustrated in FIG. 9. A user is requested to input a password on this first screen 18a of FIG. 9. It is also possible for the user to set a condition under which no password entrance is required. Then, in Step S9, the user enters an effective time period. It is also possible for the user to set a condition under which no effective time period is required to be entered.

In Step S10, the file encrypting program 5 encrypts a file designated by the user and ends the operation. Upon a completion of the operation of the file encrypting program 5, the startup control program 8 activates the CD-R writing program 6, in Step S11. Then, in Step S12, the CD-R writing program 6 writes the file encrypted by the file encrypting program 5 into the recordable area 3 of the hybrid CD-R 1 and ends the operation. Upon a completion of the operation of the CD-R writing program 6, the startup control program 8 terminates its operation, in Step S13.

Figure 10:
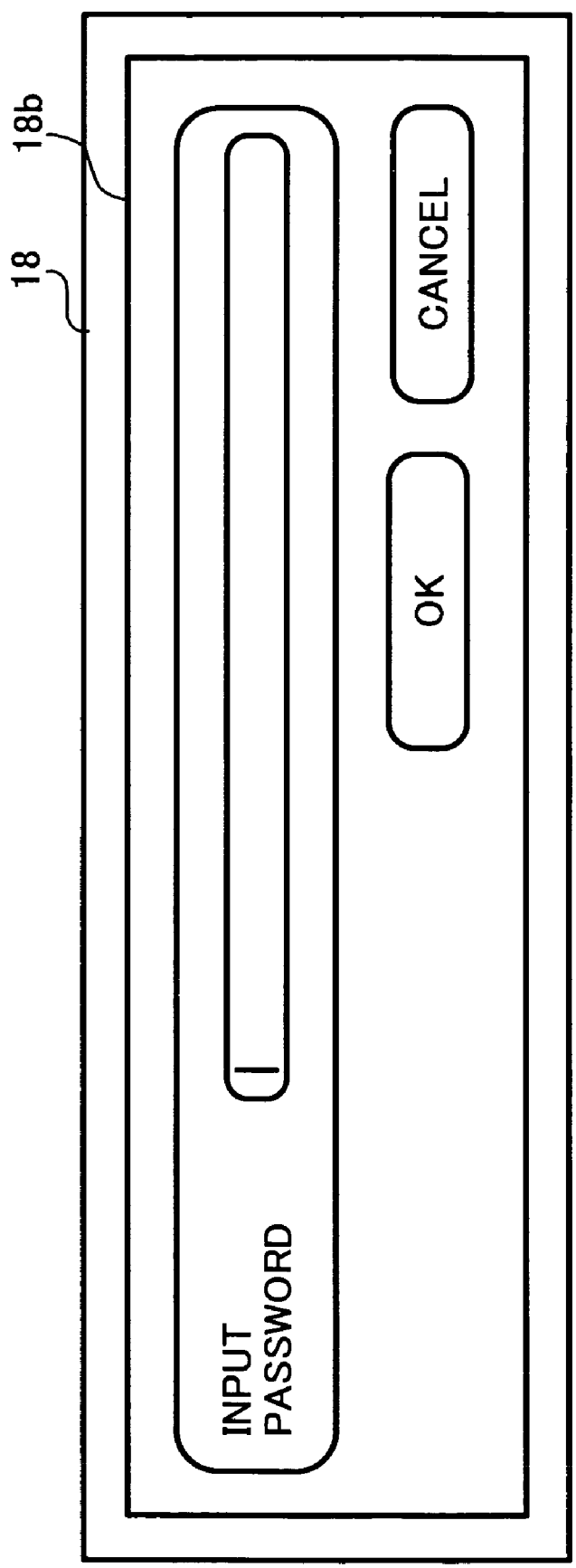

On the other hand, in Step S14, the user password is verified with a second screen 18b displayed, as illustrated in FIG. 10, on the display unit 18. In the second screen 18b of FIG. 10, the user is requested to input the password so that the password is verified with the one previously entered. When the password is determined as correct, the user is subsequently requested to input an effective time period for the password, in Step S9. However, when the password is determined as not correct, the operation of the startup control program 8 ends, in Step S13.

Figure 11:
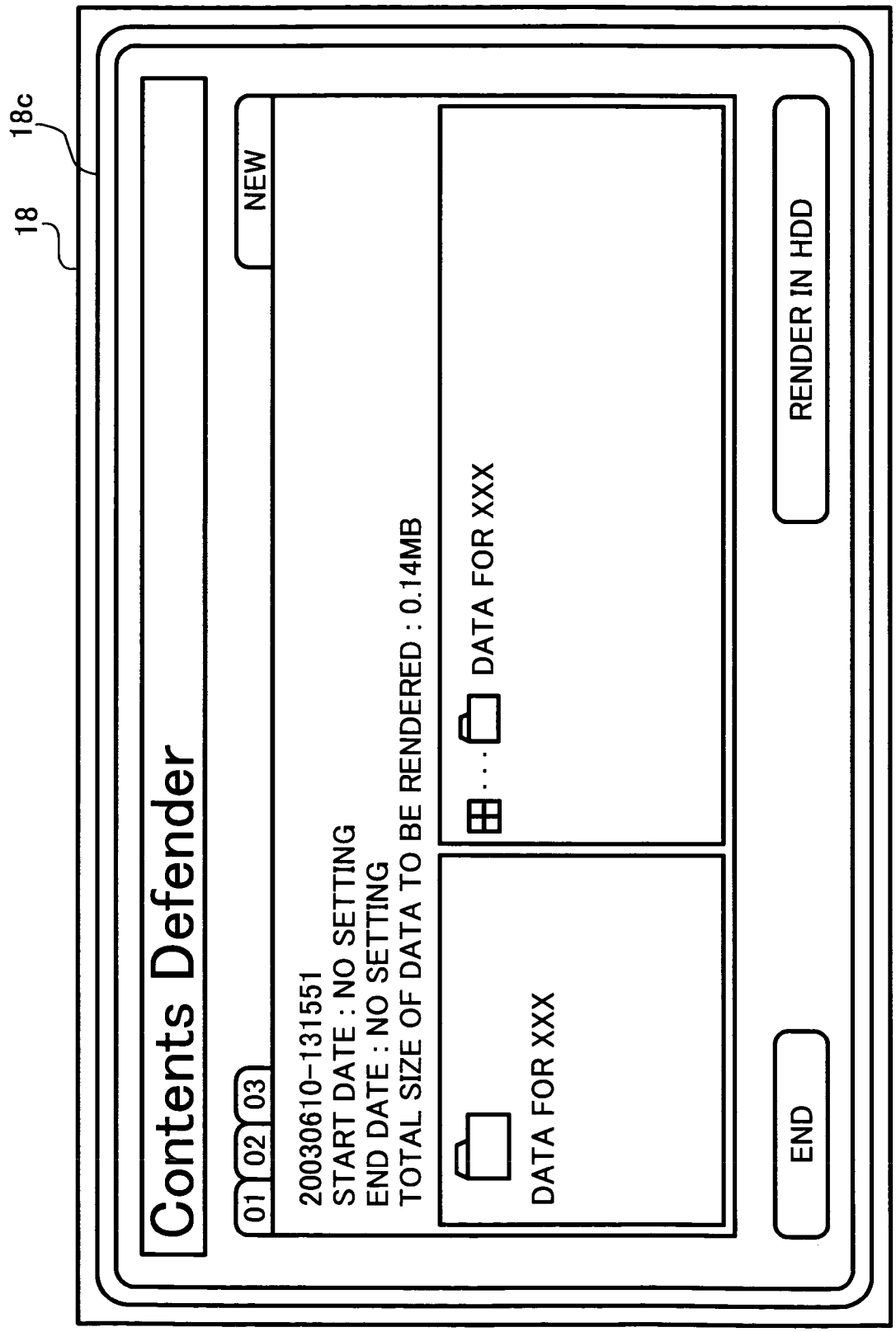

When the user request is determined in Step S5 as not the data storing operation, the process proceeds to Step S15 in which the startup control program 8 determines whether the user requests a data reading operation. The startup control program 8 returns to Step S5 when the user request is determined as not the data reading operation and to Step S16 when the user request is the data reading operation. Then, the startup control program 8 activates the file decoding program 7, in Step S16. Subsequently, the password and the effective time period are checked in Steps S17 and S18, respectively. The process proceeds to Step S13 to end the operation when the password entered is determined in Step S17 as not correct or when the present date is determined in Step S18 as not valid to the effective time period. In contrast, the file decoding program 7 instructs the display unit 18 to indicate a third screen 18c, illustrated in FIG. 11, when the password is determined as correct and the present date is determined as valid as the effective time period. The user can designate an encrypted file to be decoded and a HDD (hard disc drive) and save the decoded file into the HDD designated by the user. Then, the file decoding program 7 ends its operation. Also, the startup control program 8 ends its operation in Step S13 upon a completion of the operation of the file decoding program 7.

Next, several exemplary procedures of the unauthorized-copy judgment are explained with reference to FIGS. 12-14.

Figure 12:
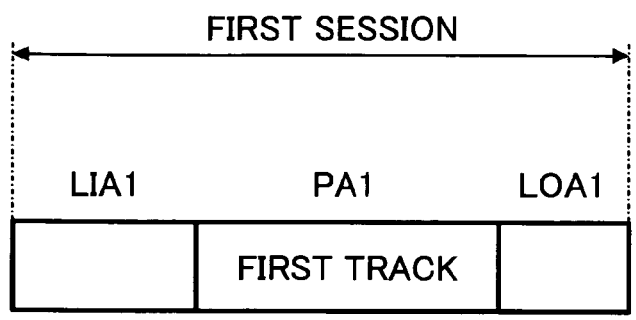
FIG. 12 is an illustration of an exemplary format in another hybrid CD-R provided with a first session having a first track continuously recorded in a copy protection mode.

In an example of the unauthorized-copy judging operation, the hybrid CD-R 1 has a first session with a first track that is continuously recorded in a copy protective manner, as shown in FIG. 12. The track has the structure of FIG. 3, where N is 1, and FIG. 4.

The hybrid CD-R 1 has at least two tracks with data recorded in a multi-session. At least one track other than the first track of the first session is recorded using a UDF (universal disc format). Data to be subjected to the unauthorized-copy judging operation is recorded in the UDF-formatted track.

An unauthorized-copy judging module executing the unauthorized-copy judging operation carries out the following processes A1-A5.

A1. To obtain, with a read TOC command, a start address (n) of user data in a track, a length (x) of user data, and control data (Ctrl).

A2. To obtain, with a read command, TDU from a user field of TDB at an address (n−8) or smaller.

A3. To obtain, with a read command, block indicators of the RO block at addresses (n+x−2) and (n+x−1).

A4. To assign a value to a variable J1. In the authorized hybrid CD-R 1, Ctrl is assigned with "4" (i.e., 0100 in binary format) and TDU is assigned with "80" (i.e., 10000000 in binary format). A value "1" representing a state of true is assigned to the variable J1 when Ctrl is "4" and when Ctrl bit2 is equal to TDU bit7 and Ctrl bit0 is equal to TDU bit4. A value "−1" representing a state of false is entered to the variable J1, however, when Ctrl is not "4," or, when Ctrl bit2 is not equal to TDU bit7, or when Ctrl bit0 is not equal to TDU bit4. Otherwise, when a command error occurs a value "0" is assigned to the variable J1.

A5. To assign a value to a variable J2. In the authorized hybrid CD-R 1, RO1 is assigned with "111" and RO2 is assigned with "110." A value "−1" representing a state of false is assigned to the variable J2 if one of RO1 and RO2 is an irregular value. If both RO1 and RO2 have correct values, a value "1" representing as a state of true is assigned to the variable J2. Otherwise, when a command error occurs, a value "0" is assigned to the variable J2.

In response to an unauthorized-copy judging command from the unauthorized-copy judging program 4, the unauthorized-copy judging module performs processes A1-A5 to seek return values for J1 and J2. The unauthorized-copy judging program 4 authenticates the hybrid CD-R 1 referring to the above-mentioned return values based on Table shown below, and determines a subsequent process depending on a given security level.

TABLE

|  | J1 | | |
| --- | --- | --- | --- |
| J2 | 1 | 0 | -1 |
| 1 | 1 | 1 | -1 |
| 0 | 1 | 0 | -1 |
| -1 | -1 | -1 | -1 |

For example, if the authenticity judgment result of the hybrid CD-R 1 based on the values of J1 and J2 is "1" or "0", the hybrid CD-R 1 is determined as a disc undergone a data copy in an authorized manner or recorded with the original data.

If the authenticity judgment result based on the values of J1 and J2 is "-1", the hybrid CD-R 1 is determined as a disc having data recorded in the unauthorized-copy mode.

Another example of the unauthorized-copy judging operation is explained below. As illustrated in FIG. 13, the hybrid CD-R 1 is provided with a second session having a second track that is continuously recorded in the copy protective mode as well as the first session having the first track continuously recorded in the copy protection mode. The track has the structure of FIG. 3, where N is 1 or 2.

The unauthorized-copy judging program 4 causes the hose computer 13 to execute at least one of two performances; one is to authenticate the hybrid CD-R 1 based on a determination as to whether in each track the TDU value of the pre-gap matches the control value of the sub-code or the control value of track information in TOC, and the other is to authenticate the hybrid CD-R 1 based on a determination as to whether the runout value at the link portion in each track or each packet is normal.

An unauthorized-copy judging module performing the unauthorized-copy operation executes the following processes B1-B5.

B1. To obtain, with a read TOC command, start addresses (n, m) of user data in track1 and track2, lengths of user data (x, y), and control (Ctrl1, Ctrl2).

B2. To obtain, with a read command, TDU1 from a user data field of TDB at an address (n–8) or smaller in track1, and TDU2 from a user data field of TDB at an address (m–8) or smaller in track2.

B3. To obtain, with a read command, block indicators RO11 and RO12 of the RO blocks in addresses at (n+x–2) and (n+x–1) in trackl and block indicators RO21 and RO22 of the RO blocks in addresses at (m+y–2) and (m+y–1) in track2.

B4. To assign a value to a variable J11. In the authorized hybrid CD-R 1, each of Ctrl1 and Ctrl2 is assigned to "4" (i.e., 0100), and each of TDU1 and TDU2 is assigned to "80" (i.e., 1000-0000). A value "1" representing a value of true is assigned to the variable J11 if Ctrl1 bit2 is equal to TDU1 bit7, Ctrl1 bit0 is equal to TDU1 bit4, and Ctrl1 is "4." A value "-1" representing a value of false is assigned to the variable J11 if Ctrl1 bit2 is not equal to TDU1 bit7, or Ctrl1 bit0 is not equal to TDU1 bit4, or Ctrl1 is not "4." When a command error occurs, a value "0" is assigned to the variable J11.

A value "1" representing a value of true is assigned to the variable J12 if Ctrl2 bit2 is equal to TDU2 bit7, Ctrl2 bit0 is equal to TDU2 bit4, and Ctrl2 is "4." A value "-1" representing a value of false is assigned to the variable J112 if Ctrl2 bit2 is not equal to TDU2 bit7, or Ctrl2 bit0 is not equal to TDU2 bit4, or Ctrl2 is not "4." When a command error occurs, a vale "0" is assigned to the variable J12.

A value "-1" is assigned to the variable J1 if one of J11 and J12 is "-1." A value "1" is assigned to the variable J1 if both J11 and J12 are "1." In a case other than these cases, a value "0" is assigned to the variable J1.

B5. To assign a value to a variable J2. In the authorized hybrid CD-R 1, each of RO11 and RO21 is assigned with "111" and each of RO12 and RP22 is assigned with "110." A value "-1" representing a state of false is assigned to the variable J2 if one of RO11, RO12, RO21, and RO22 is an irregular value. If every RO11, RO12, RO21, and RO22 have correct values, a value "1" representing as a state of true is assigned to the variable J2. Otherwise, when a command error occurs, a value "0" is assigned to the variable J2.

In response to an unauthorized-copy judging command from the unauthorized-copy judging program 4, the unauthorized-copy judging module performs processes B1-B5 to seek return values for J1 and J2. The unauthorized-copy judging program 4 authenticates the hybrid CD-R 1 referring to the above-mentioned return values based on Table shown above.

For example, if the authenticity judgment result of the hybrid CD-R 1 based on the values of J1 and J2 is "1" or "0", the hybrid CD-R 1 is determined as a disc undergone a data copy in an authorized manner or recorded with the original data.

If the authenticity judgment result based on the values of J1 and J2 is "-1", the hybrid CD-R 1 is determined as a disc having data recorded in the unauthorized-copy mode.

The present embodiment performs twice the judgment of the previously explained embodiment so as to enhance reliability of the unauthorized-copy judging operation.

Another example of the unauthorized-copy judging operation is explained below. As illustrated in FIG. 14, the hybrid CD-R 1 is provided with a first session having first and second tracks both which are continuously recorded in the copy protective mode.

The unauthorized-copy judging program 4 causes the host computer 13 to authenticate the hybrid CD-R 1 based on a determination as to whether data in the UDF track is normal according to a predetermined value.

Since a single session is used in accordance with this embodiment, as described above, no overhead due to the recording of the lead-in and the lead-out occurs.

Further, another example of the unauthorized-copy judging operation is explained below. In this case, the hybrid CD-R 1 explained with reference to FIG. 13 is provided with the second track but recorded in the VP format in the continuous copy protection mode. The authentic value of Ctrol2 is "5" (i.e., 0101) and TDU is "90" (i.e., 10010000).

Figure 13:
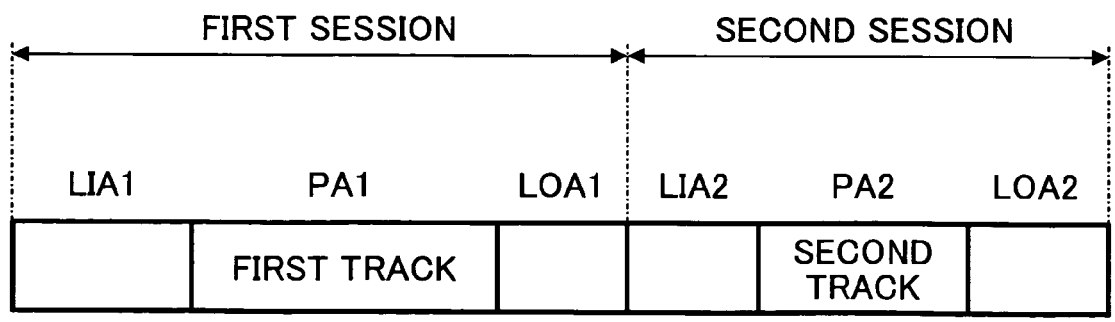
FIG. 13 is an illustration of an exemplary format in another hybrid CD-R provided with a first session having a first track continuously recorded in a copy protection mode and a second session having a second track continuously recorded in a copy protection mode.
Figure 14:
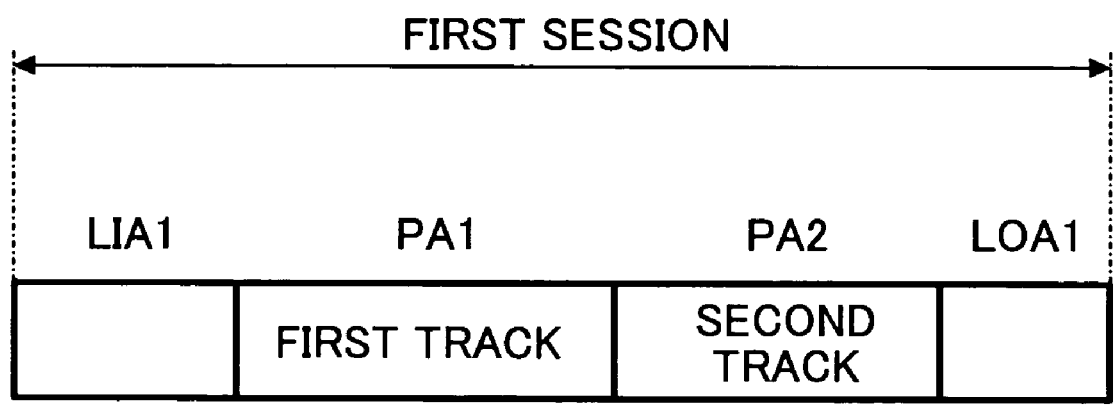
FIG. 14 is an illustration of an exemplary format in another hybrid CD-R provided with a first session having first and second tracks both continuously recorded in a copy protection mode.

In this hybrid CD-R 1, data recording is performed with ROM pits and has a track structure different from a standard CD-ROM having the structure of FIG. 13, thereby making the unauthorized copying difficult in a disc-at-once (DAO) mode. In addition, a number of materials for use in the unauthorized-copy judging operation and the reliability of such judging is enhanced.

Further, another example of the unauthorized-copy judging operation is explained below. In this case, the hybrid CD-R 1 is provided with a first session having first and second tracks which are continuously recorded in the copy protective mode, and the second track has a leading packet with a user data field filled with repetitive FF codes serving as data for the unauthorized-copy judging operation.

An unauthorized-copy judging module performing the unauthorized-copy operation executes the following processes C1-C7.

C1. To obtain, with a read TOC command, start addresses (n, m) of user data in track1 and track2, lengths of user data (x, y), and control (Ctrl1, Ctrl2).

C2. To obtain, with a read command, TDU1 from a user data field of TDB at an address (n−8) or smaller in track1, and TDU2 from a user data field of TDB at an address (m−8) or smaller in track2.

C3. To obtain, with a read command, block indicators RO11 and RO12 of the RO blocks in addresses at (n+x−2) and (n+x−1) in track1 and block indicators R21 and RO22 of the RO blocks in addresses at (m+y−2) and (m+y−1) in track2.

C4. To assign a value to a variable J11. In the authorized hybrid CD-R 1, each of Ctrl1 and Ctrl2 is assigned to "4" (i.e., 0100), and each of TDU1 and TDU2 is assigned to "80" (i.e., 1000-0000). Also, in the second track recorded in the VP format in the copy protection mode, a normal value of Ctrl2 is "5" (i.e., 0101) and a normal value of TDU2 is "90" (i.e., 10010000).

A value "1" representing a value of true is assigned to the variable J11 if Ctrl1 bit2 is equal to TDU1 bit7, Ctrl1 bit0 is equal to TDU1 bit4, and Ctrl1 is "5." A value "−1" representing a value of false is assigned to the variable J11 if Ctrl1 bit2 is not equal to TDU1 bit7, or Ctrl1 bit0 is not equal to TDU1 bit4, or Ctrl1 is not "5." When a command error occurs, a value "0" is assigned to the variable J11.

A value "1" representing a value of true is assigned to the variable J12 if Ctrl2 bit2 is equal to TDU2 bit7, Ctrl2 bit0 is equal to TDU2 bit4, and Ctrl2 is "5." A value "−1" representing a value of false is assigned to the variable J112 if Ctrl2 bit2 is not equal to TDU2 bit7, or Ctrl2 bit0 is not equal to TDU2 bit4, or Ctrl2 is not "5." When a command error occurs, a vale "0" is assigned to the variable J12.

A value "−1" is assigned to the variable J1 if one of J11 and J12 is "−1." A value "1" is assigned to the variable J1 if both J11 and J12 are "1." In a case other than these cases, a value "0" is assigned to the variable J1.

C5. To assign a value to a variable J2. In the authorized hybrid CD-R 1, each of RO11 and RO21 is assigned with "111" and each of RO12 and RP22 is assigned with "110." A value "−1" representing a state of false is assigned to the variable J2 if one of RO11, RO12, RO21, and RO22 is an irregular value. If every RO11, RO12, RO21, and RO22 have correct values, a value "1" representing as a state of true is assigned to the variable J2. Otherwise, when a command error occurs, a value "0" is assigned to the variable J2.

C6. To obtain, with a read command, data in the user data field at an arbitrary user data block address in the second track.

C7. To assign a value to a variable J3. A value "−1" representing a state of false is assigned to the variable J3 when the data is judged as not the repetitive FF codes. When the data is judged as the repetitive FF codes, a value "1" representing as a state of true is assigned to the variable J3. Otherwise, when a command error occurs, a value "0" is assigned to the variable J3.

In response to an unauthorized-copy judging command from the unauthorized-copy judging program 4, the unauthorized-copy judging module performs processes C1-C7 to seek return values for J1, J2, and J3. The unauthorized-copy judging program 4 authenticates the hybrid CD-R 1 referring to the above-mentioned return values and determines a subsequent process depending on security level.

The authenticity data such as the repetitive FF codes can previously be recorded as a constant in the unauthorized-copy judging module, or input through a keyboard (not shown) or in a form of a file.

In the read only area 2, or the first session, of the hybrid CD-R 1, the number of programs classified as the version 1 are recorded, as shown in FIG. 6. These programs may be updated and those recorded in the hybrid CD-R 1 may need to be updated accordingly.

For example, the file encryption program 5 and the CD-R writing program 6 are updated from the version 1 to a version 2. In response to the changes, the updated versions 2 of the file encryption program 5 and the CD-R writing program 6 can be recorded in an arbitrary N-th session of the recordable area 3. This recording can be performed with a general CD-R writing software.

With the above-described update recording, the file encryption program 5 and the CD-R writing program 6 on the hybrid CD-R 1 are theoretically updated to the respective versions 2.

To activate the updated programs after the update recording, the startup control program 8 reads out those programs recorded in the N-th session of the recordable area 3 and associated with the programs in the read only area 2 with a linkage between management areas provided in both sessions of the read only area 2 and the recordable area 3. Thus, the programs with the their respective versions 2 can be activated.

Figure 15:
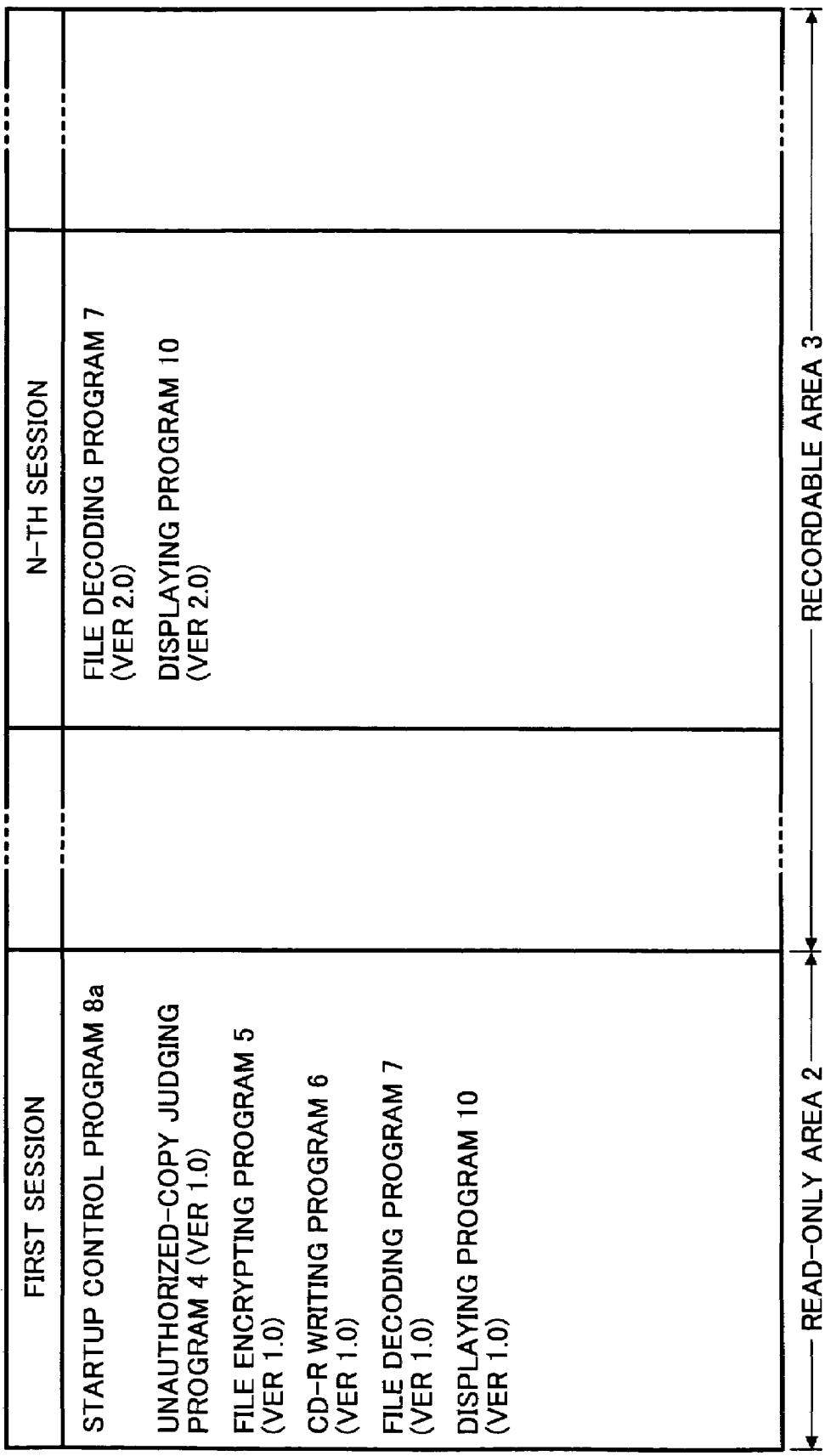
FIG. 15 is a diagram for explaining programs recorded in a read only area of another hybrid CD-R.

FIG. 15 shows programs recorded in another example of the hybrid CD-R 1. In this case, the hybrid CD-R 1 has previously been recorded in its ROM area 2 with programs including the unauthorized-copy judging program 4, the file encrypting program 5, the CD-R writing program 6, the file decoding program 7, a startup control program 8a, and a display program 10, as shown in FIG. 15.

The programs stored in the hybrid CD-R 1 will be activated in a predetermined sequence when the hybrid CD-R 1 is placed in the optical disc drive apparatus 11. An operation of the program activation is explained with reference to FIG. 16. The operating system of the hose computer 13 has a function for activating the programs stored in the hybrid CD-R 1 when the hybrid CD-R 1 is inserted thereto.

Figure 16B:
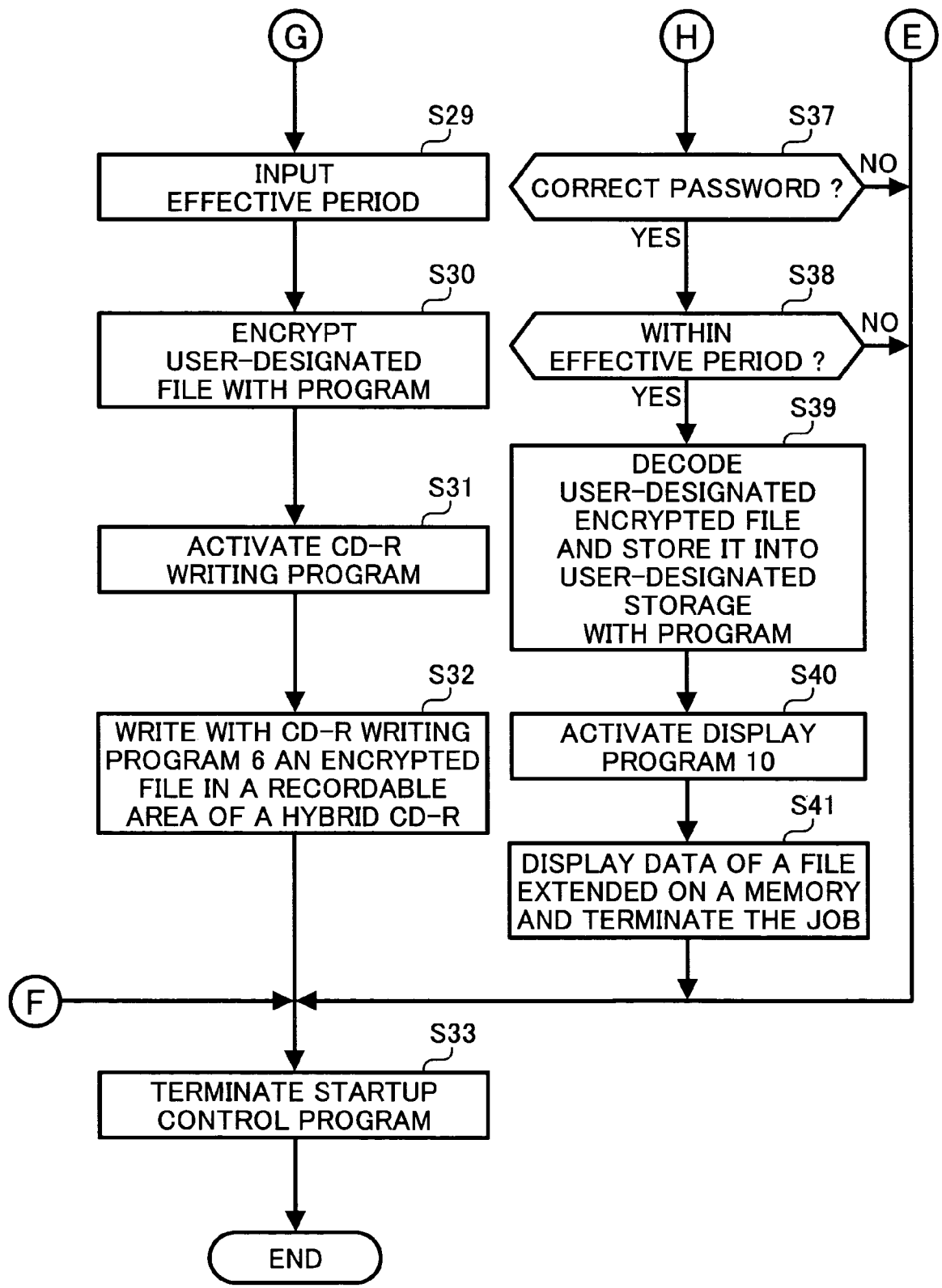
FIG. 16 is a flowchart for explaining an exemplary procedure of an unauthorized-copy judging operation performed by the programs recorded in the hybrid CD-R of FIG. 15.

In Step 21 of FIG. 16, the startup control program 8a is activated by the above-mentioned function of the operating system upon an insertion of the hybrid CD-R 1 to the optical disc drive apparatus 11. In Step S22, the startup control program 8a activates the unauthorized-copy judging program 4 which then determines whether the hybrid CD-R 1 is a disc with the unauthorized copy. Subsequently, the unauthorized-copy judging program 4 transmits the determination result to the startup control program 8, in Step S23.

In step S24, by referring to the determination result sent from the unauthorized-copy judging program 4, the startup control program 8a proceeds to Step S33 to terminate the operation when the determination result indicates the hybrid CD-R 1 is determined as a disc with an unauthorized-copy. When the determination result indicates the hybrid CD-R1 is determined as not a disc, the startup control program 8a Step S25. In Step S25, the startup control program 8a determines whether the user requests a data storing operation. The startup control program 8a proceeds to Step S26 when the user request is determined as the data storing operation and to Step S35 when the user request is determined as not the data storing operation.

In Step S26, the startup control program 8a activates the file encrypting program 5. Subsequently, in Step S27, the startup control program 8a activates the CD-R writing program 6 and determines whether the recordable area 3 is an area which has not been written yet. Then, the startup control program 8a proceeds its operation to Step S28 when the RAM area 3 is determined as not having been written yet but to Step S34 when the RAM area 3 is determined as having already been written.

In Step S28, the display unit 18 is caused to show a first screen 18a, illustrated in FIG. 9. A user is requested to input a password on this first screen 18a of FIG. 9. It is also possible for the user to set a condition under which no password entrance is required. Then, in Step S29, the user enters an effective time period. It is also possible for the user to set a condition under which no effective time period is required to be entered.

In Step S30, the file encrypting program 5 encrypts a file designated by the user and ends the operation. Upon a completion of the operation of the file encrypting program 5, the startup control program 8a activates the CD-R writing program 6, in Step S31. Then, in Step S32, the CD-R writing program 6 writes the file encrypted by the file encrypting program 5 into the recordable area 3 of the hybrid CD-R 1 and ends the operation. Upon a completion of the operation of the CD-R writing program 6, the startup control program 8a terminates its operation, in Step S33.

On the other hand, in Step S34, the user password is verified with a second screen 18b displayed, as illustrated in FIG. 10, on the display unit 18. In the second screen 18b of FIG. 10, the user is requested to input the password so that the password is verified with the one previously entered. When the password is determined as correct, the user is subsequently requested to input an effective time period for the password, in Step S29. However, when the password is determined as not correct, the operation of the startup control program 8a ends, in Step S33.

When the user request is determined in Step S25 as not the data storing operation, the process proceeds to Step S35 in which the startup control program 8a determines whether the user requests a data reading operation. The startup control program 8a returns to Step S25 when the user request is determined as not the data reading operation and to Step S36 when the user request is the data reading operation. Then, the startup control program 8a activates the file decoding program 7, in Step S36. Subsequently, the password and the effective time period are checked in Steps S37 and S38, respectively. The process proceeds to Step S33 to end the operation when the password entered is determined in Step S37 as not correct or when the present date is determined in Step S38 as not valid to the effective time period. In contrast, when the password is determined as correct and the present date is determined as valid as the effective time period, the file decoding program 7 decodes an encrypted file designated by the user, extends it in a memory of the main controller 14, and ends its operation, in Step S39. Also, the startup control program 8a activates the display program 10 in Step S40 upon a completion of the operation of the file decoding program 7. The display program 10 displays the file data decoded and extended on the memory of the main controller 14, and ends its operation according to the user instruction, in Step S41.

Upon a completion of the operation of the display program 10, the startup control program 8a ends its operation, in Step S33.

In the read only area 2, or the first session, of the hybrid CD-R 1, the number of programs classified as the version 1 are recorded, as in the case of the hybrid CD-R 1 of FIG. 6. These programs may be updated and those recorded in the hybrid CD-R 1 may need to be updated accordingly.

For example, the file encryption program 5 and the CD-R writing program 6 are updated from the version 1 to a version 2. In response to the changes, the updated versions 2 of the file encryption program 5 and the CD-R writing program 6 can be recorded in an arbitrary N-th session of the recordable area 3. This recording can be performed with a general CD-R writing software.

With the above-described update recording, the file encryption program 5 and the CD-R writing program 6 on the hybrid CD-R 1 are theoretically updated to the respective versions 2.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications No. JPAP2003-182892 filed on Jun. 26, 2003 in the Japan Patent Office, the entire contents of which are incorporated by reference herein.

What is claimed is:

1. A computer program product stored on a computer readable transportable storage medium for, when run on a data processing apparatus, carrying out a data recording operation to the computer readable transportable storage medium, comprising steps of:

providing a recordable area which allows recording of data thereinto and reading of the data therefrom and a read only area which stores a plurality of programs comprising:

a copy judging program judging whether a computer readable transportable information recording medium has undergone a copy operation;

an encrypting program encrypting data designated and stored in a computer;

a recording program; and a password control program setting or judging a password when the encrypting program is activated;

activating the copy judging program when the computer readable transportable information recording medium is placed in a computer;

identifying control data, track description unit, and run out block indicators using the copy judging program;

comparing control data to track description unit using the copy judging program to assign a first value to a first variable;

determining whether the run out block indicators are irregular to assign a second value to a second variable;

judging with the copy judging program whether the computer readable transportable information recording medium has undergone an unauthorized copy operation based on the first and second variables;

initiating the password control program when the copy judging program judges that the computer readable transportable information recording medium has not undergone an unauthorized copy operation and when a way of data storing is set;

setting a password or checking if a password is correct with the first password control program;

opening the encrypting program upon a time the password is set or a password is checked as correct with the first password control program;

encrypting data designated and stored in the computer readable transportable information recording medium, using the encrypting program;

starting the recording program; and recording the data encrypted in the encrypting step in the recordable area.

2. A program product according to claim 1, wherein the first password control program sets or judges a password and a password effective period.

3. A computer program product stored on a computer readable transportable storage medium for, when run on a data processing apparatus, carrying out a data recording operation to the computer readable transportable storage medium, comprising steps of:

providing a recordable area which allows recording of data thereinto and reading of the data therefrom and a read only area which stores a plurality of programs comprising:

a copy judging program judging whether a computer readable transportable information recording medium has undergone a copy operation;

a first password control program;

a recording program recording data;

a decoding program decoding the data encrypted and stored in the recordable area; and a second password control program judging a password when the decoding program is activated;

activating the copy judging program when the computer readable transportable information recording medium is placed in a computer;

identifying control data, track description unit, and run out block indicators using the copy judging program;

comparing control data to track description unit using the copy judging program to assign a first value to a first variable;

determining whether the run out block indicators are irregular to assign a second value to a second variable;

judging with the copy judging program whether the computer readable transportable information recording medium has undergone a copy operation based on the first and second variables;

if the computer readable transportable information recording medium has undergone a copy operation, determining whether the copy operation was authorized or unauthorized;

initiating the second password control program when the copy judging program judges that the computer readable transportable information recording medium has not undergone an unauthorized copy operation and when a way of data storing is set;

checking if a password is correct with the second password control program;

opening the decoding program upon a time the password is checked as correct with the second password control program;

decoding data encrypted and stored in the recordable area of the computer readable transportable information recording medium, using the decoding program;

starting the recording program; and recording the data decoded in the decoding step into a different information recording medium connected to a computer.

4. A computer program product stored on a computer readable transportable storage medium for, when run on a data processing apparatus, carrying out a data recording operation to the computer readable transportable storage medium, comprising steps of:

providing a recordable area which allows recording of data thereinto and reading of the data therefrom and a read only area which stores a plurality of programs comprising:

a copy judging program judging whether a computer readable transportable information recording medium has undergone a copy operation;

a first password control program;

a recording program recording data;

a decoding program decoding the data encrypted and stored in the recordable area;

an extending program extending decoded data in a memory of a computer;

a displaying program displaying data extended in the memory of the computer on a display connected to the computer; and a second password control program judging a password when the decoding program is activated;

activating the copy judging program when the computer readable transportable information recording medium is placed in a computer;

identifying control data, track description unit, and run out block indicators using the copy judging program;

comparing control data to track description unit using the copy judging program to assign a first value to a first variable;

determining whether the run out block indicators are irregular to assign a second value to a second variable;

judging with the copy judging program whether the computer readable transportable information recording medium has undergone an unauthorized copy operation based on the first and second variables;

initiating the second password control program when the copy judging program judges that the computer readable transportable information recording medium has not undergone an unauthorized copy operation and when a way of data storing is set;

checking if a password is correct with the second password control program;

opening the decoding program upon a time the password is checked as correct with the second password control program;

decoding data encrypted and stored in the recordable area of the computer readable information recording medium, using the decoding program;

starting the extending program;

extending with the extending program the data decoded in the decoding step in the memory of the computer;

running the displaying program; and displaying the data extended in the extending step on the display connected to the computer.

5. A method according to claim 4, wherein the second password control program judges a password and a password effective period.

\* \* \* \* \*